United States Patent [19]

Shioda

[11] Patent Number: 4,956,701
[45] Date of Patent: Sep. 11, 1990

[54] FREQUENCY CONVERTER FOR A DIGITAL CHROMINANCE MODULATOR

[75] Inventor: Takehiko Shioda, Tokyo, Japan

[73] Assignee: Pioneer Electronic Corporation, Tokyo, Japan

[21] Appl. No.: 405,244

[22] Filed: Sep. 11, 1989

[30] Foreign Application Priority Data

Apr. 28, 1989 [JP] Japan .................. 61-107873

[51] Int. Cl.$^5$ ........................... H04M 11/22
[52] U.S. Cl. ......................... 358/11; 358/23
[58] Field of Search ...................... 358/11, 23

[56] References Cited

U.S. PATENT DOCUMENTS 4,500,908 2/1985 Mandeberg .................. 358/11
4,845,546 7/1989 Dischert et al. .............. 358/17

FOREIGN PATENT DOCUMENTS 104866 6/1984 Japan ...................... 358/11
143588 6/1987 Japan .

Primary Examiner—John W. Shepperd
Attorney, Agent, or Firm—Sughrue, Mion, Zinn, MacPeak & Seas

[57] ABSTRACT

A frequency converter circuit for converting the frequency of a Hi-Vision carrier chrominance signal into the frequency of an NTSC signal includes a buffer memory wherein color signal data are written in according to a writing signal derived from the Hi-Vision (source) subcarrier frequency, and color signal data are read out according to a reading signal derived from the NTSC (target) subcarrier frequency. The reading signal may correspond to a delayed writing signal, which is delayed by a time derived from the target subcarrier frequency.

5 Claims, 3 Drawing Sheets

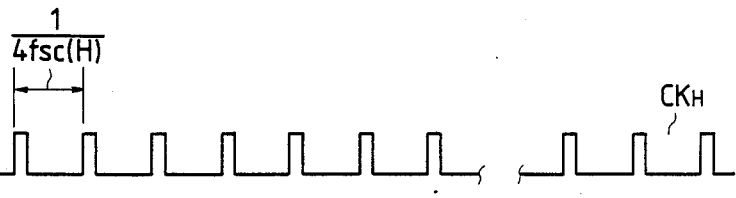
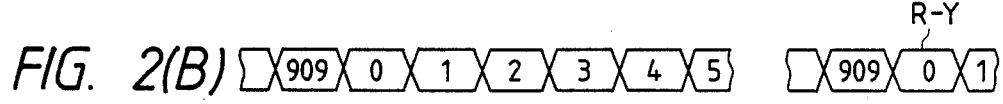
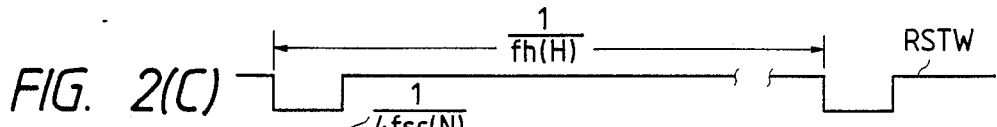
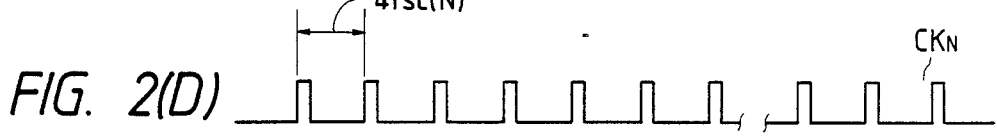
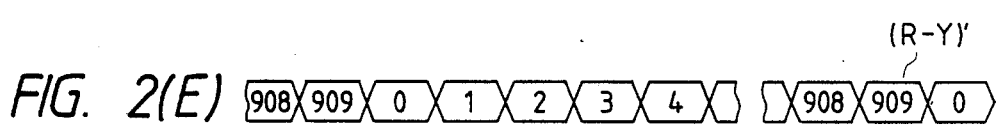
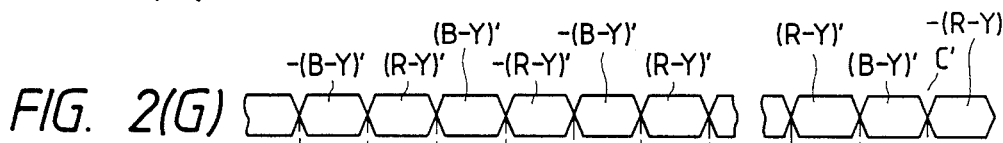
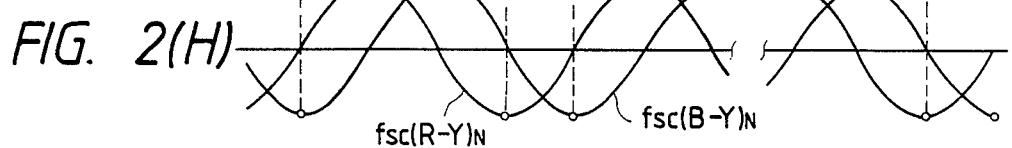

FIG. 3
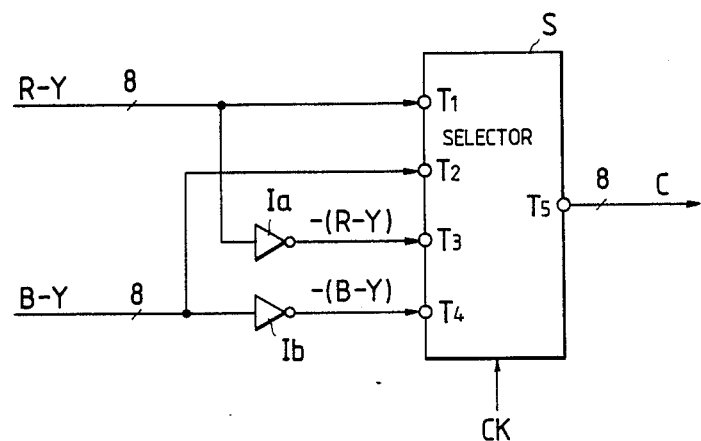
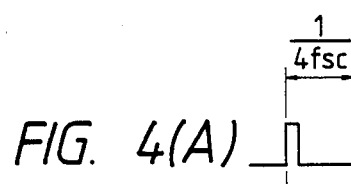
FIG. 4(A)
FIG. 4(B)
FIG. 4(C)
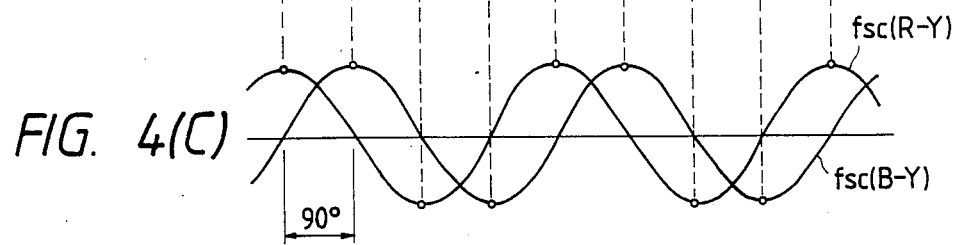

FREQUENCY CONVERTER FOR A DIGITAL CHROMINANCE MODULATOR

BACKGROUND OF THE INVENTION

1. Field of the Invention

The present invention relates to a frequency converter circuit for converting the frequency of a carrier chrominance signal into the frequency of an NTSC signal in a process of converting a Hi-Vision signal into a NTSC signal.

2. Background Art

In the NTSC method, in order to maintain compatibility between an existing color television method and a monochrome television method, output signals for the three primary colors of red (R), green (G) and blue (B) are converted into a luminance signal Y and two color signals (color difference signal or chrominance signal) by a converter circuit called a matrix circuit. The luminance signal is transmitted in the same manner as in a monochrome television method, with the color signals being transmitted by being interleaved in the interval between the luminance signal spectra using multiplexing, so that transmission is accomplished with a 6 MHz band width per channel.

With the help of analog technology, two color signals are multiplexed with a luminance signal in the following manner: the two color signals are separately modulated in amplitude using two color subcarrier signals which are similar in frequency but different by 90 degrees in phase, and the resultant carrier chrominance signals given by the modulated signals being added together are inserted in the interval between the sidebands of the luminance signal.

With the help of digital technology, a carrier chrominance signal is generated in the manner as shown in FIG. 3. From color difference signals (R-Y) and (B-Y) each consisting of an eight bit digital signal, the color difference signals (R-Y), (B-Y) and their complement or sign-inverted color difference signals -(R-Y), -(B-Y) derived by passage through sign inverter circuits Ia and Ib, are input, respectively, to the first second, third and fourth input terminals T1, T2, T3 and T4, and are switched in sequence by means of a clock signal CK with a frequency four times higher than that of the color subcarrier of a frequency fsc.

In this way, the color difference signals (R-Y), (B-Y), -(R-Y) and -(B-Y) are switched in sequence as shown in a waveform chart of FIG. 4 by the clock signal CK (FIG. 4(a)), and appear alternately in a period of 1/(4 fsc) at the output terminal T5 of a selector S, to be output therefrom, as a carrier chrominance signal (FIG. 4(b)).

This corresponds to the process in which the components of color subcarriers fsc(R-Y) and fsc(B-Y) (different by 90 degrees from each other) are extracted by a carrier chrominance signal being sampled by means of a clock signal with a frequency of 4 fsc.

Conversion of a high definition television method, for example, the Hi-Vision method into the NTSC method, involves conversions of the number of scanning lines, aspect ratio, and field frequency. According to the BTAS-001 studio standard of the Hi-Vision method, the field frequency fv(H) is 60.00 Hz, while the field frequency for the NTSC method is 59.94 Hz. Thus, the attempt to convert a Hi-Vision signal into an NTSC signal without converting the field frequency results in a color subcarrier frequency fsc(H) of 3.5831 MHz, which is slightly, that is, 1001/1000 times, higher than the color subcarrier frequency fsc(N) (=3.5795 MHz) for the NTSC method.

For this reason, if color difference signals (R-Y), (B-Y) converted from RGB signals of Hi-Vision whose field frequency is 60.00 Hz are switched alternately with a clock signal CK of the frequency 4 fsc(H) and the resultant carrier chrominance signals are sent to a NTSC receiver, proper color demodulation cannot be, or is disadvantageously, performed. Neither can color restoration be properly performed because the color signal is demodulated with the color subcarrier of the frequency fsc(N) in a NTSC receiver.

SUMMARY OF THE INVENTION

It is an object of the present invention to provide a frequency converter circuit for converting color signals converted from Hi-Vision RGB signals into a carrier chrominance signal in accordance with the NTSC method.

According to the invention, the organization is as follows. The present invention is provided with: a switching means into which the first and second color signal data and their sign-inverted color signal data are input respectively to first, second, third and fourth input terminals; a carrier chrominance signal generating circuit in which the above-mentioned color signal data are switched selectively in turn by means of a switching signal with a frequency four times as high as that of a color subcarrier; memory means in which the above first and second color signal data are temporarily stored; with a writing and reading of the above color signal data to and from the memory being performed using first and second clock signals, the latter of which is used as a switching signal for the above switching means.

Illustratively, two color signals sent in the field frequency of the Hi-Vision method fv(H) (=60.00 Hz) are written to the memory means by a clock signal $CK_H$ with a frequency 4 fsc(H) which is four times higher than that of a color subcarrier signal, the color signals written in memory are read out through a clock signal $CK_N$ with a frequency 4 fsc(N) which is four times higher than that of a color subcarrier of the NTSC method to be input to the switching means.

In the switching means, the first and second color signals and their sign-inverted color signals are supplied respectively to the first, second, third and fourth input terminals, the supplied color signals are switched in turn by means of the clock signal $CK_N$ to be output as a carrier chrominance signal from the output terminal T5. In this way, the switching means outputs a carrier chrominance signal following the NTSC method into which color signals converted into Hi-Vision RGB signals have been converted.

Further objects and advantages of the present invention will be apparent from the following description of the preferred embodiments of the invention taken together with the accompanying drawings.

BRIEF DESCRIPTION OF THE DRAWINGS

FIGS. 2A–2A are waveform charts used to illustrate the operations of FIG. 1;

FIG. 3 is a block diagram showing an existing television method; and

FIG. 4A–4C are waveform charts used to illustrate the operations of FIG. 3.

DETAILED DESCRIPTION OF THE PREFERRED EMBODIMENTS

Figure 1:
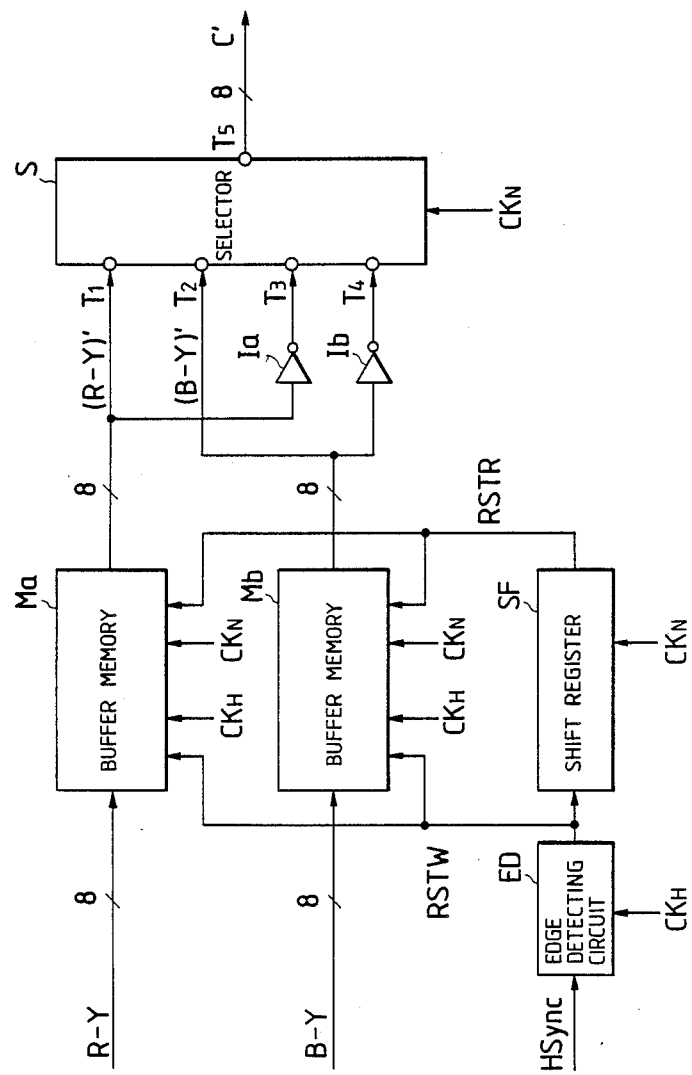
FIG. 1 is a block diagram showing an embodiment of the invention.

FIG. 1 is a block diagram showing an embodiment of frequency converter circuits according to the present invention, wherein elements similar to those found in FIG. 3 are denoted with identical reference numbers.

The embodiment is provided with: buffer memories Ma, Mb for temporarily memorizing the two color difference signals (R-Y) and (B-Y) which each consist of eight bit digital signals; sign inverter circuits Ia, Ib for inverting a sign of the outputs from the memories Ma and Mb; and a selector S having first to fourth input terminals T1 to T4 connected for inputting an output from the memory Ma to the first input terminal T1, an output from the memory Mb to the second input terminal T2, an output from the sign inverter circuit Ia to the third input terminal T3, and an output from the sign inverter Ib to the fourth input terminal T4; an edge-detecting circuit ED for detecting a rising edge of a horizontal synchronous signal, and for supplying a write-in reset signal RSTW to the memories Ma and Mb; and a shift register SF for delaying the output signal from the edge-detecting circuit ED to supply a delayed signal to the memories Ma and Mb for use as a read-out reset signal RSTR.

In the above organization as shown in FIG. 2, unchanged color difference signals (R-Y) and (B-Y) which are delivered with a field frequency of a Hi-Vision method (=60.00 Hz), are written into the memories Ma and Mb (FIG. 2($b$)) using a write-in clock $CK_H$ (FIG. 2($a$)) with a frequency of 4 fsc(H) (=4*3.583 MHz). A writing address is reset by a write-in reset signal RSTW (FIG. 2($c$)) generated on every occurrence of a horizontal synchronous signal HSync with a line frequency fh(H) (=15.750 KHz). Here, the color subcarrier frequency fsc and the line frequency fh are in a relationship which can be expressed as fsc=455/(2*fh). This yields the alternative expression: 4*fsc=910*fh. That is, one horizontal period consists of 910*$CK_H$.

The color difference signals (R-Y) and (B-Y) written in memories Ma and Mb are read out (FIG. 2($e$)) by a read-out clock signal $CK_N$ (FIG. 2($d$)) with the frequency 4*fsc (=4*3.579 MHz) which is four times higher than that of a color subcarrier for the NTSC method, the color difference signals (R-Y), (B-Y) being supplied as color difference signals (R-Y)', (B-Y)' to the input terminals T1, T2 of the selector S, respectively, and the color difference signals (R-Y)', (B-Y)' being sign-inverted by sign inverters Ia, Ib to be supplied as color difference signals -(R-Y)''-(B-Y)' to the input terminals T3, T4 of the selector S, respectively.

In the above-mentioned reading out of the memories Ma and Mb, a read-out address is reset by a read-out reset signal RSTR (FIG. 2($f$)). The reset signal RSTR is derived from a reset signal RSTW which has been delayed by the clock signal $CK_N$ in a shift register SF. The reset signal is thus derived from both clock signals $CK_N$ and $CK_N$ and accordingly accommodates the timing of the clock signals $CK_H$ and $CK_N$ at every horizontal period to prevent the periodic difference between the clock signals $CK_H$, $CK_N$ ($CK_H<CK_N$) from causing the write-in address to catch up with the read-out address, as the memories Ma, Mb are reset by reset signals RSTR and RSTW.

Then the selected S selectively switches the input color difference signals in turn with the clock signal $CK_N$ to output them as a carrier chrominance signal C' into which the signals (R-Y) and (B-Y) have been modulated with NTSC color subcarriers fsc(R-Y)N and fsc(B-Y)N (FIG. 2($h$)).

Whereas, in the above embodiment, temporary storing of color difference signals (R-Y) and (B-Y) is done using each occurrence of the horizontal period, a memory for storing only one word (for example, 8 bits) may be used for each of the memories Ma and Mb. Use of a one word memory is possible because of a controlled word-sized flow of signals, being written into with the write-in clock $CK_H$ and being read out of with the read-out clock $CK_N$, and because a read-out address is reset with the reset signal RSTR according to each occurrence of the horizontal period.

At this time, since, as described above, the difference between the color subcarrier frequency of Hi-Vision fsc(H) and that of NTSC fsc(N) is approximately 1001/1000, the difference between the clock signals $CK_H$ and $CK_N$ for memories is also about 1001/1000, which causes no operational problem even if one word memories are used.

According to the present invention, color signals can be properly restored with the color subcarrier of 3.5795 MHz at a NTSC receiver because Hi-Vision color signals have its frequency converted into that of NTSC color signals by using buffer memories.

Many widely different embodiments of the present invention may be construed without departing from the spirit and scope of the present invention, and the present invention is not limited to the specific embodiments described in the specification, except as defined in the appended claims.

What is claimed is:

1. A frequency converter circuit, comprising:
   memory means for temporarily storing first and second color signal data;
   switching means having said first and second color signal data output from said memory means and third and fourth color signal data which are complements of said first and second color signal data input to first through fourth input terminals, respectively, said switching means for selectively and alternatively switching the data of said first, second, third and fourth color signal data which have been input to said switching means, by means of a switching signal with a frequency which is four times as high as that of a color subcarrier which is to be used to generate a carrier chrominance signal to be output;
   buffer control means for controlling a writing and reading of said first and second color signal data to and from said memory means according to first and second clock signals which are different from each other in frequency; and
   wherein said second clock signal is used as said switching signal for said switching means.

2. The circuit of claim 1 wherein said second clock signal is a signal with a frequency which is four times as high as that of NTSC color subcarrier.

3. A frequency converter circuit for converting signals impressed on a source subcarrier frequency of a first television standard to corresponding signals impressed on a target subcarrier frequency of a different television standard said circuit comprising:

memory means for temporarily storing first and second color signal data;

switching means having said first and second color signal data and third and fourth color signal data which are complements of said first and second color signal data input to first through fourth input terminals, respectively, said switching means for selectively and alternately switching between each of said first, second, third and fourth color signal data, by means of a switching signal with a frequency related to said target subcarrier frequency;

buffer control means for controlling a writing and reading of said first and second color signal data to and from said memory means, said buffer means controlling a writing according to a writing signal derived from said source subcarrier frequency, and controlling a reading according to a reading signal derived from said target subcarrier frequency.

4. A frequency converter circuit as claimed in claim 3, wherein said reading signal corresponds to a delayed writing signal, which is delayed by a time derived from said target subcarrier frequency.

5. A frequency converter circuit as claimed in claim 4, wherein said source subcarrier frequency is of a Hi-Vision television standard and said target subcarrier frequency is of a NTSC television standard.

* * * * *